US008204329B2

(12) United States Patent
Zhang et al.

(10) Patent No.: US 8,204,329 B2
(45) Date of Patent: Jun. 19, 2012

(54) SYSTEM AND METHOD FOR IMAGE QUALITY ENHANCEMENT BY REDUCING THE EFFECTS OF AIR POLLUTION AND HAZE

(75) Inventors: Ximin Zhang, San Jose, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 606 days.

(21) Appl. No.: 12/486,519

(22) Filed: Jun. 17, 2009

(65) Prior Publication Data

US 2010/0321531 A1    Dec. 23, 2010

(51) Int. Cl.
G06K 9/40          (2006.01)
(52) U.S. Cl. ............................................. 382/254
(58) Field of Classification Search .................. 382/254, 382/257, 263, 274, 275; 348/606, 609; 386/307, 386/309, 311
See application file for complete search history.

(56) References Cited

U.S. PATENT DOCUMENTS

| 6,556,708 | B1 * | 4/2003 | Christian et al. ............... 382/165 |
| 8,055,029 | B2 * | 11/2011 | Petrescu et al. ............... 382/118 |
| 2003/0152285 | A1 * | 8/2003 | Feldmann et al. ............. 382/274 |
| 2007/0248264 | A1 * | 10/2007 | Graves et al. ................. 382/167 |
| 2008/0317287 | A1 * | 12/2008 | Haseyama ..................... 382/103 |

FOREIGN PATENT DOCUMENTS
CN            1753489 A       3/2006

OTHER PUBLICATIONS

Fattal ("Single Image Dehazing", ACM Transactions on Graphics, vol. 27, No. 3, Article 72, Aug. 2008).*
Robby T. Tan et al., "Visibility Enhancement for Roads with Foggy or Hazy Scenes", IEEE, 2007, pp. 19-24, WeA1.4, Proceedings of the 2007 IEEE Intelligent Vehicles Symposium Istanbul, Turkey, Jun. 13-15, 2007.
Shree K. Nayar et al., "Vision in Bad Weather", IEEE, 8 pages, Department of Computer Science, Columbia University, New York, New York 10027.
Nicolas Hautiere et al., "Contrast Restoration of Foggy Images through use of an Onboard Camera", IEEE, 2005, pp. 1090-1095, FA4.2, Proceedings of the 8th International IEEE Conference on Intelligent Transportation Systems Vienna, Austria, Sep. 13-16, 2005.
Raanan Fattal, "Single Image Dehazing", ACM Transactions on Graphics, Aug. 2008, pp. 72.1-72.9, vol. 27, No. 3 Article 72, Hebrew University of Jerusalem, Israel.

* cited by examiner

*Primary Examiner* — Jason M Repko
*Assistant Examiner* — Shervin Nakhjavan
(74) *Attorney, Agent, or Firm* — Haverstock & Owens LLP

(57) ABSTRACT

A low cost image quality enhancement method to be utilized in an ordinary consumer camera and for post processing of an existing image database is described herein. The quality enhancement is transferred into an adaptive intensity stretching process in the YUV domain. A different enhancement process is designed for a luminance (Y) channel and chrominance (UV) channel. The parameters in the enhancement process are estimated based on the contents of the image. After the stretching-based enhancement, an adaptive unsharp masking process is applied to the luminance data. The quality is significantly improved for the images shot under unfavorable conditions.

43 Claims, 3 Drawing Sheets

SYSTEM AND METHOD FOR IMAGE QUALITY ENHANCEMENT BY REDUCING THE EFFECTS OF AIR POLLUTION AND HAZE

FIELD OF THE INVENTION

The present invention relates to the field of image processing. More specifically, the present invention relates to image quality enhancement.

BACKGROUND OF THE INVENTION

In human eyes, a blue sky and crystal clear air provide the best view of nature's beauty. Pictures shot under this condition are more pleasing than the pictures shot under unfavorable circumstances such as foggy weather, air pollution and other factors causing atmospheric phenomena-haze. These unfavorable circumstances greatly reduce the visibility of distant regions in images of outdoor scenes. This is due to the presence of aerosols such as dust, mist, and pollution which deflect light from its original course of propagation. Under these circumstances, the image quality is severely degraded. The image contrasts are usually reduced and original vivid colors become faint. These kinds of degraded pictures not only lose the visual vividness and appeal but due to the poor visibility of the image, the details suffer.

This quality degradation not only influences personal photographs shot by amateurs, but also influence pictures taken by professional photographers and satellite shot pictures. Hence, image quality enhancement techniques to combat this problem are desirable. The prior art methods in this area are attributable to three categories: polarizing filter-based methods, multiple picture-based methods and cost function minimization-based methods.

The main idea of polarizing filter-based methods is to rotate a polarizing filter to exploit two or more images of the same scene that have different degrees of polarization. Although good results are able to be obtained, the polarizing filter only exists in high end cameras due to its cost. Moreover, the polarizing filter is not able to be applied to dynamic scenes for which the changes are faster than the filter rotations in finding the suitable polarization, and the filter is not able to be used to process the previously shot picture.

The main idea of multiple picture-based methods is to exploit the differences of two or more images of the same scene that have different properties of the participating medium. However, the photographer has to wait for the change of properties of the medium (e.g. weather, pollution, others). Moreover, the multiple picture method is not able to be applied to dynamic scenes for which the moment is not able to be reproduced. The above limitations make the multiple picture method unrealistic for most scenarios.

The main idea of cost function minimization-based methods is to build a cost function based on certain theoretical assumptions. Then, the cost is minimized by running a global optimization method such as a gradient descent to estimate the image without degradation. However, the computational cost is too high to integrate into an ordinary consumer camera. Moreover, the optimization process is uncontrollable and is able to lead to unexpected artifacts.

SUMMARY OF THE INVENTION

A low cost image quality enhancement method to be utilized in an ordinary consumer camera and for post processing of an existing image database is described herein. The quality enhancement is transferred into an adaptive intensity stretching process in the YUV domain. A different enhancement process is designed for a luminance (Y) channel and chrominance (UV) channel. The parameters in the enhancement process are estimated based on the contents of the image. After the stretching-based enhancement, an adaptive unsharp masking process is applied to the luminance data. The quality is significantly improved for the images shot under unfavorable conditions.

In one aspect, a method of enhancing an image implemented on a device comprises calculating an additive airlight based on an estimated airlight, adjusting each luminance pixel of the image to generate improved luminance values, adjusting each U and V pixel value of the image using a content adaptive adjustment level to generate improved chrominance values, combining the luminance values with the chrominance values and outputting an enhanced image. The method further comprises calculating a maximum luminance intensity value and a minimum luminance intensity value among pixels in the image. The method further comprises adjusting the maximum intensity value and the minimum value intensity value according to a first threshold and a second threshold. The method further comprises estimating airlight with the obtained maximum intensity value. The method further comprises calculating a content dependent parameter for each pixel in the image. Estimating airlight and calculating the content dependent parameter occur at the same time. Calculating the additive airlight is with the maximum luminance intensity value, the minimum luminance intensity value and the content dependent parameter. The parameter depends on a pixel location and overall intensity distribution of the image. Calculating the parameter further comprises detecting a skyline point in each pixel column, calculating an offset for each pixel column and calculating the parameter using a height of the skyline point and the offset. Each luminance pixel is adjusted based on the additive airlight, the maximum luminance intensity value, the minimum luminance intensity value and the content dependent parameter. The method further comprises applying an adaptive unsharp masking to the luminance pixels to generate improved luminance pixels. The method further comprises generating the content adaptive adjustment level for each U and V pixel. Generating the content adaptive adjustment level further comprises checking the chrominance pixel intensity, continuing to adjustment level generation, if the intensity is greater than a threshold including calculating an initial adjustment level, calculating an adaptive threshold and determining a final adjustment level and not adjusting the level if the intensity is not greater than the threshold. Combining occurs after all of the pixels are processed. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method implemented on a device comprises calculating a maximum luminance intensity value and a minimum luminance intensity value among pixels in an image, estimating airlight with the obtained maximum intensity value, calculating a content dependent parameter for each pixel in the image, calculating an additive airlight with the maximum luminance intensity value, the minimum luminance intensity value and the content dependent parameter, adjusting each luminance pixel, applying an adaptive unsharp masking to the luminance pixels to generate improved luminance pixels, generating a content adaptive adjustment level for each U and V pixel, adjusting each U and V pixel value using the level to generate improved chrominance pixels, combining the improved luminance pixels with the improved chrominance pixels and outputting an enhanced image. The method further comprises adjusting the maximum intensity value and the minimum value intensity value according to a first threshold and a second threshold. Estimating airlight and calculating the content dependent parameter occur at the same time. The parameter depends on a pixel location and overall intensity distribution of the image. Calculating the parameter further comprises detecting a skyline point in each pixel column, calculating an offset for each pixel column and calculating the parameter using a height of the skyline point and the offset. Each luminance pixel is adjusted based on the additive airlight, the maximum luminance intensity value, the minimum luminance intensity value and the content dependent parameter. Generating the content adaptive adjustment level further comprises checking the chrominance pixel intensity, continuing to adjustment level generation, if the intensity is greater than a threshold including calculating an initial adjustment level, calculating an adaptive threshold and determining a final adjustment level and not adjusting the level if the intensity is not greater than the threshold. Combining occurs after all of the pixels are processed. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a device comprises a minimum/maximum luminance extraction module configured for calculating a maximum luminance intensity and a minimum luminance intensity of pixels in an image, an airlight estimation module operatively coupled to the minimum/maximum luminance extraction module, the airlight estimation module configured for estimating an airlight, a content dependent parameter extraction module operatively coupled to the airlight estimation module, the content dependent parameter extraction module configured for calculating a content dependent parameter, an additive airlight estimation module operatively coupled to the content dependent parameter extraction module, the additive airlight estimation module configured for calculating an additive airlight, a luminance adjustment module operatively coupled to the additive airlight estimation module, the luminance adjustment module configured for adjusting each luminance pixel value, a content adaptive level generation module operatively coupled to the luminance adjustment module, the content adaptive level generation module configured for generating a content adaptive adjustment level for each U and V pixel, an adaptive unsharp masking module operatively coupled to the content adaptive level generation module, the adaptive unsharp masking module configured for applying an adaptive unsharp mask to the luminance pixels to generate improved luminance pixels, a UV adjustment module operatively coupled to the adaptive unsharp masking module, the UV adjustment module configured for adjusting the U and V pixel value using the level to generate improved chrominance pixels and a YUV mix module operatively coupled to the UV adjustment module, the YUV mix module configured for combining the improved luminance pixels and the improved chrominance pixels and outputting an enhanced image. The minimum/maximum luminance extraction module is further configured for adjusting the maximum intensity value and the minimum value intensity value according to a first threshold and a second threshold. Estimating airlight and calculating the content dependent parameter occur at the same time. The parameter depends on a pixel location and overall intensity distribution of the image. The content dependent parameter extraction module is further configured for detecting a skyline point in each pixel column, calculating an offset for each pixel column and calculating the parameter using a height of the skyline point and the offset. Each luminance pixel is adjusted based on the additive airlight, the maximum luminance intensity value, the minimum luminance intensity value and the content dependent parameter. The content adaptive level generation module is further configured for checking the chrominance pixel intensity, continuing to adjustment level generation, if the intensity is greater than a threshold including calculating an initial adjustment level, calculating an adaptive threshold and determining a final adjustment level and not adjusting the level if the intensity is not greater than the threshold. Combining occurs after all of the pixels are processed. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In some embodiments, a device comprises a memory for storing an application, the application configured for calculating a maximum luminance intensity value and a minimum luminance intensity value among pixels in an image, estimating airlight with the obtained maximum intensity value, calculating a content dependent parameter for each pixel in the image, calculating an additive airlight with the maximum luminance intensity value, the minimum luminance intensity value and the content dependent parameter, adjusting each luminance pixel, applying an adaptive unsharp masking to the luminance pixels to generate improved luminance pixels, generating a content adaptive adjustment level for each U and V pixel, adjusting each U and V pixel value using the level to generate improved chrominance pixels, combining the improved luminance pixels with the improved chrominance pixels and outputting an enhanced image and a processing component coupled to the memory, the processing component configured for processing the application. The application is further configured for adjusting the maximum intensity value and the minimum value intensity value according to a first threshold and a second threshold. Estimating airlight and calculating the content dependent parameter occur at the same time. The parameter depends on a pixel location and overall intensity distribution of the image. Calculating the parameter further comprises detecting a skyline point in each pixel column, calculating an offset for each pixel column and calculating the parameter using a height of the skyline point and the offset. Each luminance pixel is adjusted based on the additive airlight, the maximum luminance intensity value, the minimum luminance intensity value and the content dependent parameter. Generating the content adaptive adjustment level further comprises checking the chrominance pixel intensity, continuing to adjustment level generation, if the intensity is greater than a threshold including calculating an initial adjustment level, calculating an adaptive threshold and determining a final adjustment level and not adjusting the level if the intensity is not greater than the threshold. Combining occurs after all of the pixels are processed. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a camera comprises a lens, a sensor configured for acquiring an input image through the lens, a memory for storing an application, the application configured for calculating a maximum luminance intensity value and a minimum luminance intensity value among pixels in the image, estimating airlight with the obtained maximum intensity value, calculating a content dependent parameter for each pixel in the image, calculating an additive airlight with the maximum luminance intensity value, the minimum luminance intensity value and the content dependent parameter, adjusting each luminance pixel, applying an adaptive unsharp masking to the luminance pixels to generate improved luminance pixels, generating a content adaptive adjustment level for each U and V pixel, adjusting each U and V pixel value using the level to generate improved chrominance pixels, combining the improved luminance pixels with the improved chrominance pixels and outputting an enhanced image and a processing component coupled to the memory, the processing component configured for processing the application.

DETAILED DESCRIPTION OF THE PREFERRED EMBODIMENT

Under ideal conditions, the light from objects travels to a viewer along a straight line without degradation. However, if an unfavorable condition exists, the light from the object passes through a scattering medium. The light is attenuated along its original course and is distributed to other directions. This attenuation process is modeled mathematically as:

$$\text{Attenuation} = e^{-\beta(x)d(x)}$$

$\beta(x)$: Atmospheric attenuation coefficient
$d(x)$: Distance between object and viewer At the same time, the scattering lights from all other directions also travel to the viewer. This added light is assumed as constant light and known as airlight. Combining the attenuation model with the airlight model, the image formation is able to be described as:

$$I(x) = A_\infty R(x) e^{-\beta(x)d(x)} + A_\infty (1 - e^{-\beta(x)d(x)})$$

$I(x)$: Direct observation
$A_\infty$: Airlight
$R(x)$: Reflectance

The model is used to describe the image formation on the three RGB channels in the presence of a scattering medium.

The model is transferred to the YUV domain. The original intensity is $I_O(x) = A_\infty R(x)$ and observed additive airlight is $AD(x) = A_\infty (1 - e^{-\beta(x)d(x)})$. The image enhancement task is transferred to the estimation of the original intensity as the following stretching process:

$$I_O(x) = \frac{(I(x) - AD(x)) * A_\infty}{A_\infty - AD(x)}$$

Figure 1:
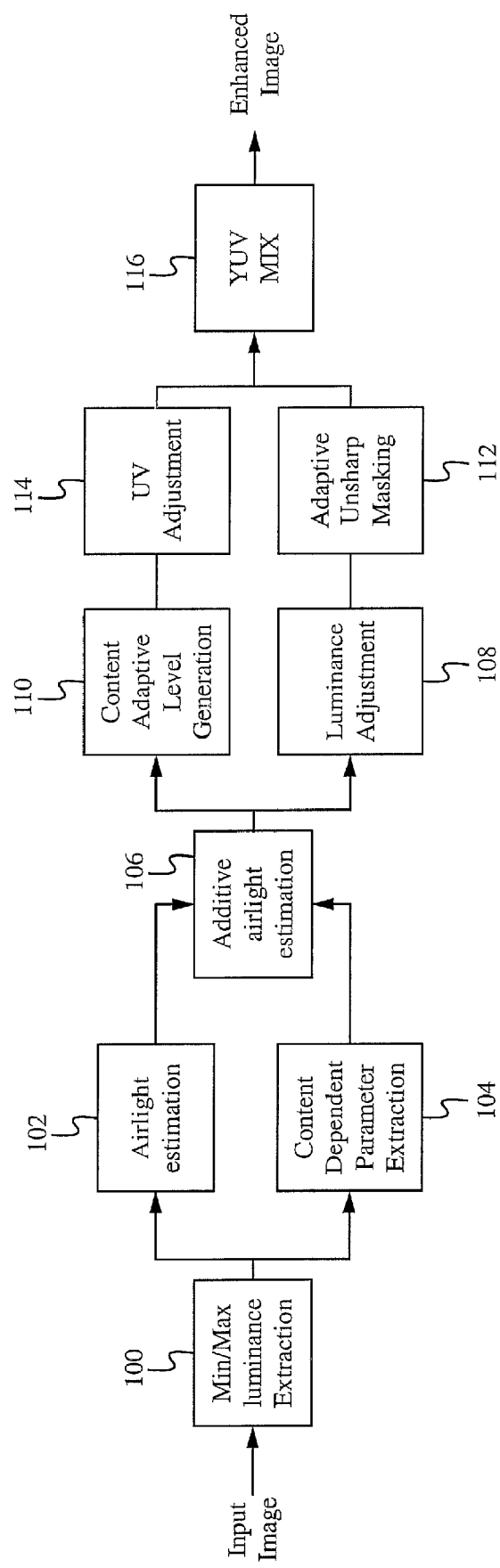
FIG. 1 illustrates a flowchart of an overall scheme of image quality enhancement according to some embodiments.

The overall architecture of the developed method is illustrated in FIG. 1. For the input image, the maximum luminance intensity value and minimum luminance intensity value among all of the pixels in the image are calculated, in the step 100. The maximum intensity value and the minimum value intensity value are then adjusted according to two thresholds.

With the obtained maximum intensity value, the airlight is estimated, in the step 102. A content dependent parameter P(x) is calculated for each pixel, in the step 104. In some embodiments, the steps 102 and 104 occur at the same time. The parameter P(x) depends on the pixel location and the overall intensity distribution of the image.

With the maximum intensity value $Y_{max}$, the minimum intensity value $Y_{min}$ and the content dependent parameter P(x), the observed additive airlight AD(x) is calculated, in the step 106.

In the step 108, in the luminance channel, each luminance pixel value is adjusted in the luminance adjustment module based on the parameters obtained in the previous module. An adaptive unsharp masking is applied to the luminance pixels to further increase the contrast in the texture area, in the step 112. In some embodiments, the step 112 occurs after all of the luminance pixels are processed.

In the step 110, in the chrominance domain, a set of procedures are able to generate a content adaptive adjustment level for each U and V pixel. The level is then used to adjust the U and V pixel value, in the step 114. After all of the pixels are processed, the luminance values are mixed with chrominance values and output as the final enhanced image, in the step 116.

Min/Max Luminance Extraction

The maximum luminance intensity value and minimum luminance intensity value among all of the pixels in the image are calculated. To avoid the over saturation problem, the maximum luminance intensity value and minimum luminance intensity value are adjusted:

$$Y_{max} = \begin{cases} T_1 & \text{if } Y_{max} > T_1 \\ Y_{max} & \text{if } Y_{max} \leq T_1 \end{cases}$$

$$Y_{min} = \begin{cases} T_2 & \text{if } Y_{min} > T_2 \\ Y_{min} & \text{if } Y_{min} \leq T_2 \end{cases}$$

where $T_1$ and $T_2$ are two constant thresholds.

Airlight Estimation

Since the airlight is able to be thought of as a source of the light, the maximum luminance value is able to represent the airlight. Thus, it is able to be estimated:

$$A_\infty = \begin{cases} 255 & \text{if } Y_{max} > 255 - T_3 \\ Y_{max} + T_3 & \text{if } Y_{max} \leq 255 - T_3 \end{cases}$$

In the above equation, $T_3$ is a constant threshold. The above estimation serves the purpose of enhancement and may not be the true theoretical value.

Content Dependent Parameter Extraction

Figure 2:
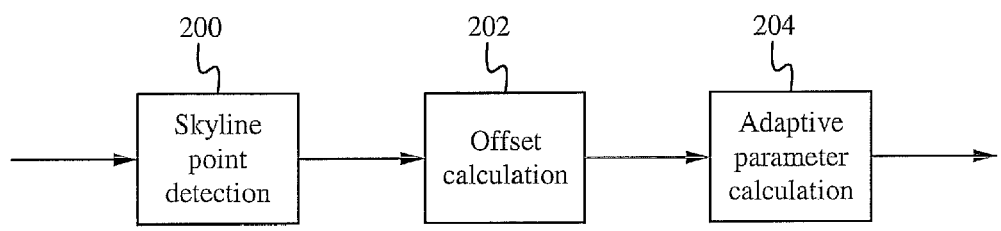
FIG. 2 illustrates a flowchart of a method of content dependent parameter extraction according to some embodiments.

The content dependent parameter depends on both pixel location and overall intensity distribution of the picture. The extraction procedure is illustrated in FIG. 2.

In the step 200, a skyline point in each pixel column is detected. The skyline point is the point that the sky touches objects on the earth. The skyline point detection is able to be performed in any implementation such as by detecting the first significant horizontal edge point from the top of the image.

Letting i denote the horizontal pixel position and S(i) denote the vertical skyline point position, an offset is calculated for each pixel column, in the step 202, as:

$$\text{Offset}(i) \begin{cases} \dfrac{\text{Height}}{4} & \text{if} \quad S(i) < \dfrac{\text{Height}}{4} + 8 \\ \dfrac{3*\text{Height}}{4} & \text{if} \quad S(i) > \dfrac{3*\text{Height}}{4} - 8 \\ S(i) + 8 & \text{otherwise} \end{cases}$$

In the above equation, height is the number of pixels in one pixel column.

Then, the adaptive parameter is calculated, in the step 204, as:

$$P(i, j) = \begin{cases} \text{Height}/8 & \text{if} \quad (\text{Offset}(i) - j)/4 > \text{Height}/8 \\ 0 & \text{if} \quad \dfrac{\text{Offset}(i) - j}{4} < 0 \\ \dfrac{\text{Offset}(i) - j}{4} & \text{Otherwise} \end{cases}$$

In the above equation, j is the vertical pixel position (in the following, vector x is used to represent the pixel position (i, j).

One way to reduce the complexity of the above procedure is to skip the skyline point detection and always assume it in a fixed position in each pixel column.

Additive Airlight Estimation

First, the additive airlight is estimated as:

$$AD(x) = A_\infty - Y_{max} + Y_{min}$$

Then, it is adjusted as:

$$AD(X) = \begin{cases} I(x) & \text{if} \quad AD(X) > I(x) \\ AD(x) & \text{otherwise} \end{cases}$$

where I(x) is the observed luminance intensity value.

Luminance Enhancement

Based on adaptive stretching, the luminance pixel value is able to be adjusted:

$$I_O(x) = \frac{(I(x) - P(x)) \times A_\infty}{A_\infty - AD(x)} - \left( Y_{min} + \frac{I(x) \times A_\infty \times Y_{min}}{(A_\infty - AD(x)) \times Y_{max}} \right)$$

After the adjustment, adaptive unsharp masking is applied to the texture area to further increase the contrast of the luminance pixels.

Chrominance Enhancement

Figure 3:
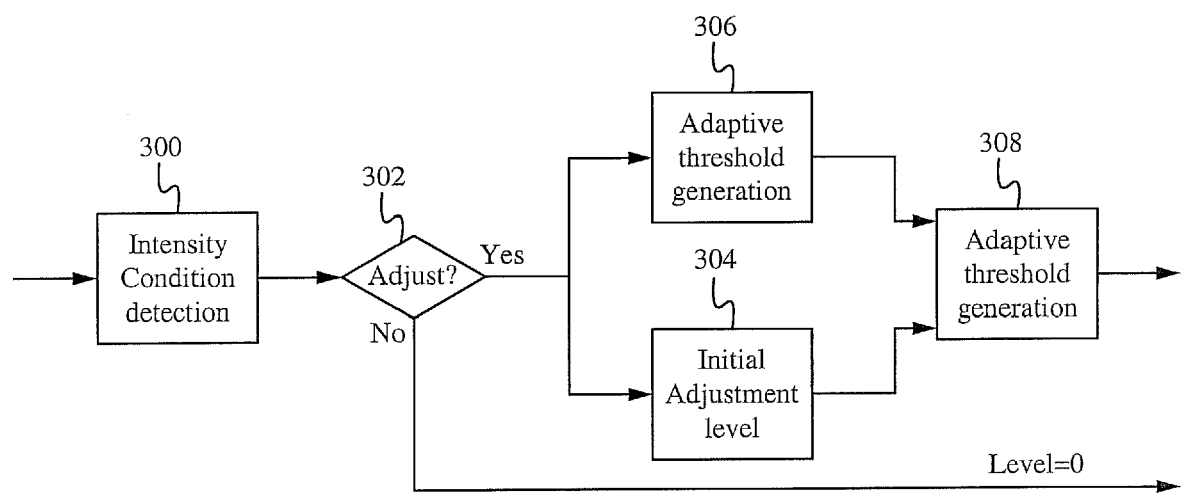
FIG. 3 illustrates a flowchart of a method of content adaptive adjustment level generation according to some embodiments.

The content adaptive adjustment level depends on the chrominance pixel intensity value, the stretching factor obtained in luminance enhancement and characteristics of the U and V channel. The generation procedure is illustrated in FIG. 3.

In the step 300, chrominance pixel intensity is checked. For the U channel pixel, if $I_U(x) > T_4$, the adjustment condition check continues the adjustment level generation, in the step 302. Otherwise, no adjustment is necessary, and the adjustment level is set to zero. For the V channel pixel, if $I_V(x) > T_5$, the adjustment condition check continues the adjustment level generation, in the step 302. Otherwise, no adjustment is necessary, and the adjustment level is set to zero. $T_4$ and $T_5$ are constant thresholds.

The initial adjustment level is calculated, in the step 304, as follows:

$$\text{Level}(x) = \frac{(I_U(x) - 127) \times A_\infty}{A_\infty - AD(x)}$$

Then, for the U channel pixel, the adaptive threshold is calculated as follows, in the step 306. $T_6$ is a constant threshold.

$$T_{adaptive}(x) = 2 \times (I_U(x) - 127) * I_O = (x)/T_6$$

For the V channel pixel, the adaptive threshold is calculated, in the step 306, as:

$$T_{adaptive}(x) = I_V(x) - 128$$

After that, the final adjustment level is obtained, in the step 308, as:

$$\text{Level}(x) = \begin{cases} \text{Level}(x) & \text{if} \quad |\text{Level}(x)| < |T_{adaptive}(x)| \\ T_{adaptive(x)} & \text{otherwise} \end{cases}$$

The level is further adjusted as:

$$\text{Level}(x) = \begin{cases} 16 & \text{if} \quad \text{Level}(x) > 16 \\ -16 & \text{if} \quad \text{Level}(x) < -16 \\ \text{Level}(x) & \text{Otherwise} \end{cases}$$

Finally, the pixels in the U and V channels are adjusted as follows:

$$I_{U,V}(x) = I_{U,V}(x) + \text{Level}(x)$$

By combining/mixing the enhanced pixels in the luminance and chrominance channels, the enhanced image is obtained.

Figure 4:
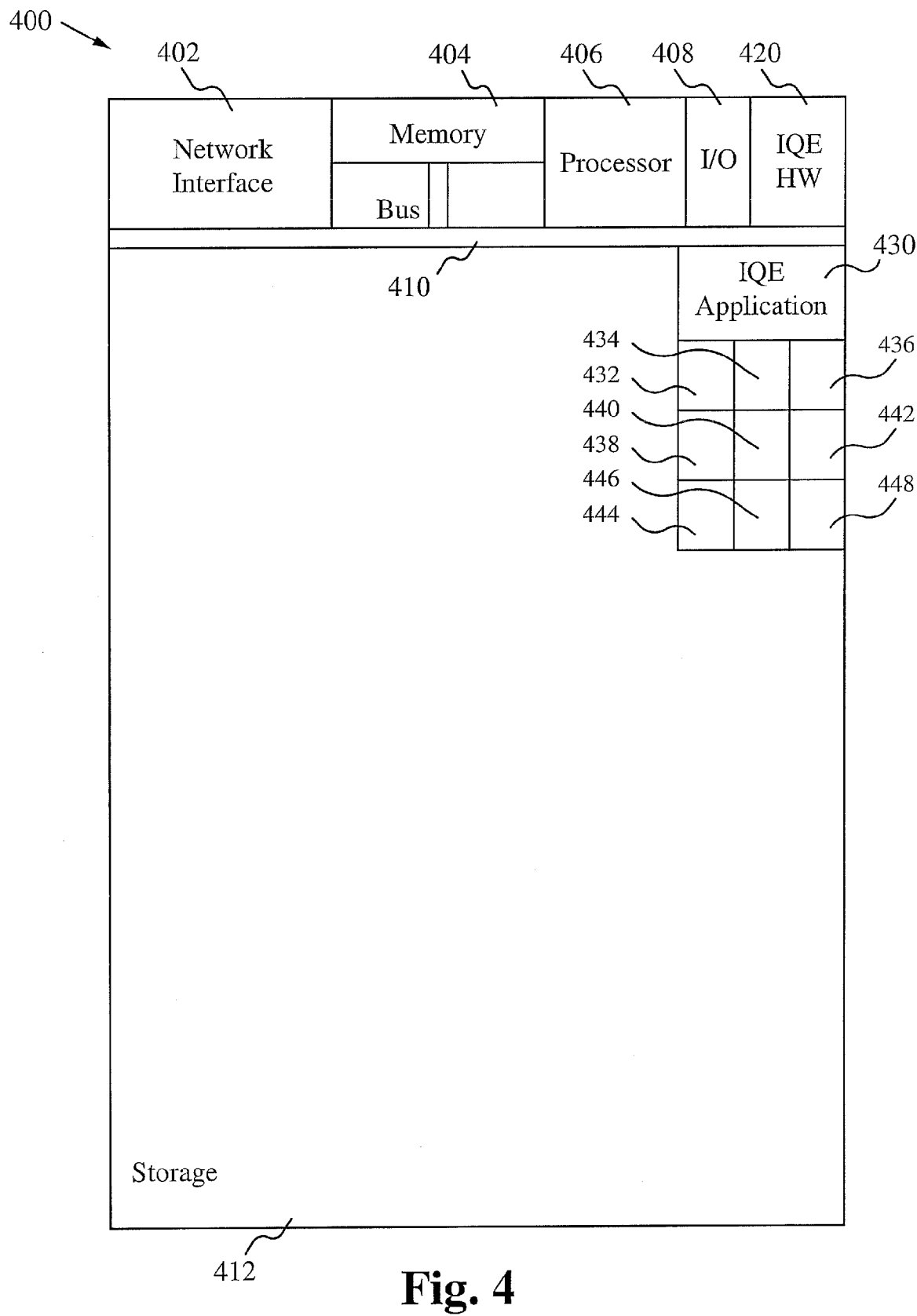
FIG. 4 illustrates a block diagram of an exemplary computing device configured to implement image quality enhancement according to some embodiments.

FIG. 4 illustrates a block diagram of an exemplary computing device 400 configured to implement image quality enhancement according to some embodiments. The computing device 400 is able to be used to acquire, store, compute, communicate and/or display information such as images and videos. For example, a computing device 400 is able to acquire and store an image. The image quality enhancement method is able to be used to enhance image quality on the device 400. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Image quality enhancement application(s) 430 used to perform the image quality enhancement method are likely to be stored in the storage device 412 and memory 404 and processed as applications are typically processed. More or less components shown in FIG. 4 are able to be included in the computing device 400. In some embodiments, image quality enhancement hardware 420 is included. Although the computing device 400 in FIG. 4 includes applications 430 and hardware 420 for image quality enhancement, the image quality enhancement method is able to be implemented on a computing device in hardware, firmware, software or any combination thereof.

In some embodiments, the image quality enhancement application(s) 430 include several applications and/or modules. A min/max luminance extraction module 432 is configured for calculating the maximum luminance intensity and minimum luminance intensity of pixels in an image. An airlight estimation module 434 is configured for estimating an airlight. A content dependent parameter extraction module 436 is configured for calculating a content dependent parameter. An additive airlight estimation module 438 is configured for calculating an additive airlight. A luminance adjustment module 440 is configured for adjusting each luminance pixel value. A content adaptive level generation module 442 is configured for generating a content adaptive adjustment level for each U and V pixel. An adaptive unsharp masking module 444 is configured for applying a an adaptive unsharp mask. A UV adjustment module 446 is configured for adjusting the U and V pixel value. A YUV mix module 448 is configured for mixing/combining the luminance pixels and the chrominance pixels and outputting the enhanced image. Fewer or additional modules are able to be included as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

A specific example of a computing device implementing image quality enhancement is a camera which includes a lens, a sensor such as a Charge-Coupled Device (CCD) or Complementary Metal Oxide Semiconductor (CMOS), a storage component such as a hard drive or a flash memory, a processing component and other standard image acquisition components. The camera functions as any other camera, for example, when a user presses a button to acquire an image, the lens, sensor and processor function together to acquire the desired image. The image quality enhancement is able to be used in conjunction with the standard functionality of the camera to produce enhanced images.

To utilize image quality enhancement, a user acquires an image such as by a digital camera, and then while the image is acquired or after the image is acquired, the image is able to be enhanced using the image quality enhancement method. For example, while an image is being acquired, the image quality enhancement is able to take place, or after an image is acquired, a user is able to process the image and enhance it. In some embodiments, the camera automatically implements the image quality enhancement, and in some embodiments, a user manually selects to implement the image quality enhancement.

In operation, the image quality enhancement method does not use a polarizing filter. The image quality enhancement method is based on a single picture, not multiple pictures. Furthermore, the complexity of the processing of the image quality enhancement method is negligible compared to the cost function optimization-based methods. The image quality enhancement method is able to be utilized in real-time processing in a device with minor additional cost. The method is also able to be applied to an existing image database to achieve good post-processing effects. The method provides enhanced images so that they appear as if taken under high quality lighting conditions.

In some embodiments, media able to utilize the method described herein includes but is not limited to images, videos and other data.

Embodiments of Image Quality Enhancement

1. A method of enhancing an image implemented on a device comprising:
   a. calculating an additive airlight based on an estimated airlight;
   b. adjusting each luminance pixel of the image to generate improved luminance values;
   c. adjusting each U and V pixel value of the image using a content adaptive adjustment level to generate improved chrominance values;
   d. combining the luminance values with the chrominance values; and
   e. outputting an enhanced image.
2. The method of clause 1 further comprising calculating a maximum luminance intensity value and a minimum luminance intensity value among pixels in the image.
3. The method of clause 2 further comprising adjusting the maximum intensity value and the minimum value intensity value according to a first threshold and a second threshold.
4. The method of clause 3 further comprising estimating airlight with the obtained maximum intensity value.
5. The method of clause 4 further comprising calculating a content dependent parameter for each pixel in the image.
6. The method of clause 5 wherein estimating airlight and calculating the content dependent parameter occur at the same time.
7. The method of clause 5 wherein calculating the additive airlight is with the maximum luminance intensity value, the minimum luminance intensity value and the content dependent parameter.
8. The method of clause 5 wherein the parameter depends on a pixel location and overall intensity distribution of the image.
9. The method of clause 5 wherein calculating the parameter further comprises:
   a. detecting a skyline point in each pixel column;
   b. calculating an offset for each pixel column; and
   c. calculating the parameter using a height of the skyline point and the offset.
10. The method of clause 1 wherein each luminance pixel is adjusted based on the additive airlight, the maximum luminance intensity value, the minimum luminance intensity value and the content dependent parameter.
11. The method of clause 1 further comprising applying an adaptive unsharp masking to the luminance pixels to generate improved luminance pixels.
12. The method of clause 1 further comprising generating the content adaptive adjustment level for each U and V pixel.
13. The method of clause 12 wherein generating the content adaptive adjustment level further comprises:
   a. checking the chrominance pixel intensity;
   b. continuing to adjustment level generation, if the intensity is greater than a threshold including:
      i. calculating an initial adjustment level;
      ii. calculating an adaptive threshold; and
      iii. determining a final adjustment level; and
   c. not adjusting the level if the intensity is not greater than the threshold.

14. The method of clause 1 wherein combining occurs after all of the pixels are processed.
15. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
16. A method implemented on a device comprising:
    a. calculating a maximum luminance intensity value and a minimum luminance intensity value among pixels in an image;
    b. estimating airlight with the obtained maximum intensity value;
    c. calculating a content dependent parameter for each pixel in the image;
    d. calculating an additive airlight with the maximum luminance intensity value, the minimum luminance intensity value and the content dependent parameter;
    e. adjusting each luminance pixel;
    f. applying an adaptive unsharp masking to the luminance pixels to generate improved luminance pixels;
    g. generating a content adaptive adjustment level for each U and V pixel;
    h. adjusting each U and V pixel value using the level to generate improved chrominance pixels;
    i. combining the improved luminance pixels with the improved chrominance pixels; and
    j. outputting an enhanced image.
17. The method of clause 16 further comprising adjusting the maximum intensity value and the minimum value intensity value according to a first threshold and a second threshold.
18. The method of clause 16 wherein estimating airlight and calculating the content dependent parameter occur at the same time.
19. The method of clause 16 wherein the parameter depends on a pixel location and overall intensity distribution of the image.
20. The method of clause 16 wherein calculating the parameter further comprises:
    a. detecting a skyline point in each pixel column;
    b. calculating an offset for each pixel column; and
    c. calculating the parameter using a height of the skyline point and the offset.
21. The method of clause 16 wherein each luminance pixel is adjusted based on the additive airlight, the maximum luminance intensity value, the minimum luminance intensity value and the content dependent parameter.
22. The method of clause 16 wherein generating the content adaptive adjustment level further comprises:
    a. checking the chrominance pixel intensity;
    b. continuing to adjustment level generation, if the intensity is greater than a threshold including:
        i. calculating an initial adjustment level;
        ii. calculating an adaptive threshold; and
        iii. determining a final adjustment level; and
    c. not adjusting the level if the intensity is not greater than the threshold.
23. The method of clause 16 wherein combining occurs after all of the pixels are processed.
24. The method of clause 16 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
25. A system implemented on a device comprising:
    a. a minimum/maximum luminance extraction module configured for calculating a maximum luminance intensity and a minimum luminance intensity of pixels in an image;
    b. an airlight estimation module operatively coupled to the minimum/maximum luminance extraction module, the airlight estimation module configured for estimating an airlight;
    c. a content dependent parameter extraction module operatively coupled to the airlight estimation module, the content dependent parameter extraction module configured for calculating a content dependent parameter;
    d. an additive airlight estimation module operatively coupled to the content dependent parameter extraction module, the additive airlight estimation module configured for calculating an additive airlight;
    e. a luminance adjustment module operatively coupled to the additive airlight estimation module, the luminance adjustment module configured for adjusting each luminance pixel value;
    f. a content adaptive level generation module operatively coupled to the luminance adjustment module, the content adaptive level generation module configured for generating a content adaptive adjustment level for each U and V pixel;
    g. an adaptive unsharp masking module operatively coupled to the content adaptive level generation module, the adaptive unsharp masking module configured for applying an adaptive unsharp mask to the luminance pixels to generate improved luminance pixels;
    h. a UV adjustment module operatively coupled to the adaptive unsharp masking module, the UV adjustment module configured for adjusting the U and V pixel value using the level to generate improved chrominance pixels; and
    i. a YUV mix module operatively coupled to the UV adjustment module, the YUV mix module configured for combining the improved luminance pixels and the improved chrominance pixels and outputting an enhanced image.
26. The system of clause 25 wherein the minimum/maximum luminance extraction module is further configured for adjusting the maximum intensity value and the minimum value intensity value according to a first threshold and a second threshold.
27. The system of clause 25 wherein estimating airlight and calculating the content dependent parameter occur at the same time.
28. The system of clause 25 wherein the parameter depends on a pixel location and overall intensity distribution of the image.
29. The system of clause 25 wherein the content dependent parameter extraction module is further configured for:
    a. detecting a skyline point in each pixel column;
    b. calculating an offset for each pixel column; and
    c. calculating the parameter using a height of the skyline point and the offset.
30. The system of clause 25 wherein each luminance pixel is adjusted based on the additive airlight, the maximum luminance intensity value, the minimum luminance intensity value and the content dependent parameter.

31. The system of clause 25 wherein the content adaptive level generation module is further configured for:
   a. checking the chrominance pixel intensity;
   b. continuing to adjustment level generation, if the intensity is greater than a threshold including:
      i. calculating an initial adjustment level;
      ii. calculating an adaptive threshold; and
      iii. determining a final adjustment level; and
   c. not adjusting the level if the intensity is not greater than the threshold.
32. The system of clause 25 wherein combining occurs after all of the pixels are processed.
33. The system of clause 25 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
34. A device comprising:
   a. a memory for storing an application, the application configured for:
      i. calculating a maximum luminance intensity value and a minimum luminance intensity value among pixels in an image;
      ii. estimating airlight with the obtained maximum intensity value;
      iii. calculating a content dependent parameter for each pixel in the image;
      iv. calculating an additive airlight with the maximum luminance intensity value, the minimum luminance intensity value and the content dependent parameter;
      v. adjusting each luminance pixel;
      vi. applying an adaptive unsharp masking to the luminance pixels to generate improved luminance pixels;
      vii. generating a content adaptive adjustment level for each U and V pixel;
      viii. adjusting each U and V pixel value using the level to generate improved chrominance pixels;
      ix. combining the improved luminance pixels with the improved chrominance pixels; and
      x. outputting an enhanced image; and
   b. a processing component coupled to the memory, the processing component configured for processing the application.
35. The device of clause 34 wherein the application is further configured for adjusting the maximum intensity value and the minimum value intensity value according to a first threshold and a second threshold.
36. The device of clause 34 wherein estimating airlight and calculating the content dependent parameter occur at the same time.
37. The device of clause 34 wherein the parameter depends on a pixel location and overall intensity distribution of the image.
38. The device of clause 34 wherein calculating the parameter further comprises:
   a. detecting a skyline point in each pixel column;
   b. calculating an offset for each pixel column; and
   c. calculating the parameter using a height of the skyline point and the offset.
39. The device of clause 34 wherein each luminance pixel is adjusted based on the additive airlight, the maximum luminance intensity value, the minimum luminance intensity value and the content dependent parameter.
40. The device of clause 34 wherein generating the content adaptive adjustment level further comprises:
   a. checking the chrominance pixel intensity;
   b. continuing to adjustment level generation, if the intensity is greater than a threshold including:
      i. calculating an initial adjustment level;
      ii. calculating an adaptive threshold; and
      iii. determining a final adjustment level; and
   c. not adjusting the level if the intensity is not greater than the threshold.
41. The device of clause 34 wherein combining occurs after all of the pixels are processed.
42. The device of clause 34 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
43. A camera comprising:
   a. a lens;
   b. a sensor configured for acquiring an input image through the lens;
   c. a memory for storing an application, the application configured for:
      i. calculating a maximum luminance intensity value and a minimum luminance intensity value among pixels in the image;
      ii. estimating airlight with the obtained maximum intensity value;
      iii. calculating a content dependent parameter for each pixel in the image;
      iv. calculating an additive airlight with the maximum luminance intensity value, the minimum luminance intensity value and the content dependent parameter;
      v. adjusting each luminance pixel;
      vi. applying an adaptive unsharp masking to the luminance pixels to generate improved luminance pixels;
      vii. generating a content adaptive adjustment level for each U and V pixel;
      viii. adjusting each U and V pixel value using the level to generate improved chrominance pixels;
      ix. combining the improved luminance pixels with the improved chrominance pixels; and
      x. outputting an enhanced image; and
   d. a processing component coupled to the memory, the processing component configured for processing the application.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of enhancing an image implemented on a device comprising:
   a. calculating an additive airlight based on an estimated airlight;
   b. adjusting each luminance pixel of the image to generate improved luminance values;

c. adjusting each U and V pixel value of the image using a content adaptive adjustment level to generate improved chrominance values;
d. combining the luminance values with the chrominance values; and
e. outputting an enhanced image.

2. The method of claim 1 further comprising calculating a maximum luminance intensity value and a minimum luminance intensity value among pixels in the image.

3. The method of claim 2 further comprising adjusting the maximum intensity value and the minimum value intensity value according to a first threshold and a second threshold.

4. The method of claim 3 further comprising estimating airlight with the obtained maximum intensity value.

5. The method of claim 4 further comprising calculating a content dependent parameter for each pixel in the image.

6. The method of claim 5 wherein estimating airlight and calculating the content dependent parameter occur at the same time.

7. The method of claim 5 wherein calculating the additive airlight is with the maximum luminance intensity value, the minimum luminance intensity value and the content dependent parameter.

8. The method of claim 5 wherein the parameter depends on a pixel location and overall intensity distribution of the image.

9. The method of claim 5 wherein calculating the parameter further comprises:
   a. detecting a skyline point in each pixel column;
   b. calculating an offset for each pixel column; and
   c. calculating the parameter using a height of the skyline point and the offset.

10. The method of claim 1 wherein each luminance pixel is adjusted based on the additive airlight, the maximum luminance intensity value, the minimum luminance intensity value and the content dependent parameter.

11. The method of claim 1 further comprising applying an adaptive unsharp masking to the luminance pixels to generate improved luminance pixels.

12. The method of claim 1 further comprising generating the content adaptive adjustment level for each U and V pixel.

13. The method of claim 12 wherein generating the content adaptive adjustment level further comprises:
   a. checking the chrominance pixel intensity;
   b. continuing to adjustment level generation, if the intensity is greater than a threshold including:
      i. calculating an initial adjustment level;
      ii. calculating an adaptive threshold; and
      iii. determining a final adjustment level; and
   c. not adjusting the level if the intensity is not greater than the threshold.

14. The method of claim 1 wherein combining occurs after all of the pixels are processed.

15. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

16. A method implemented on a device comprising:
   a. calculating a maximum luminance intensity value and a minimum luminance intensity value among pixels in an image;
   b. estimating airlight with the obtained maximum intensity value;
   c. calculating a content dependent parameter for each pixel in the image;
   d. calculating an additive airlight with the maximum luminance intensity value, the minimum luminance intensity value and the content dependent parameter;
   e. adjusting each luminance pixel;
   f. applying an adaptive unsharp masking to the luminance pixels to generate improved luminance pixels;
   g. generating a content adaptive adjustment level for each U and V pixel;
   h. adjusting each U and V pixel value using the level to generate improved chrominance pixels;
   i. combining the improved luminance pixels with the improved chrominance pixels; and
   j. outputting an enhanced image.

17. The method of claim 16 further comprising adjusting the maximum intensity value and the minimum value intensity value according to a first threshold and a second threshold.

18. The method of claim 16 wherein estimating airlight and calculating the content dependent parameter occur at the same time.

19. The method of claim 16 wherein the parameter depends on a pixel location and overall intensity distribution of the image.

20. The method of claim 16 wherein calculating the parameter further comprises:
   a. detecting a skyline point in each pixel column;
   b. calculating an offset for each pixel column; and
   c. calculating the parameter using a height of the skyline point and the offset.

21. The method of claim 16 wherein each luminance pixel is adjusted based on the additive airlight, the maximum luminance intensity value, the minimum luminance intensity value and the content dependent parameter.

22. The method of claim 16 wherein generating the content adaptive adjustment level further comprises:
   a. checking the chrominance pixel intensity;
   b. continuing to adjustment level generation, if the intensity is greater than a threshold including:
      i. calculating an initial adjustment level;
      ii. calculating an adaptive threshold; and
      iii. determining a final adjustment level; and
   c. not adjusting the level if the intensity is not greater than the threshold.

23. The method of claim 16 wherein combining occurs after all of the pixels are processed.

24. The method of claim 16 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

25. A system implemented on a device comprising:
   a. a minimum/maximum luminance extraction module configured for calculating a maximum luminance intensity and a minimum luminance intensity of pixels in an image;
   b. an airlight estimation module operatively coupled to the minimum/maximum luminance extraction module, the airlight estimation module configured for estimating an airlight;
   c. a content dependent parameter extraction module operatively coupled to the airlight estimation module, the content dependent parameter extraction module configured for calculating a content dependent parameter;
d. an additive airlight estimation module operatively coupled to the content dependent parameter extraction module, the additive airlight estimation module configured for calculating an additive airlight;
e. a luminance adjustment module operatively coupled to the additive airtight estimation module, the luminance adjustment module configured for adjusting each luminance pixel value;
f. a content adaptive level generation module operatively coupled to the luminance adjustment module, the content adaptive level generation module configured for generating a content adaptive adjustment level for each U and V pixel;
g. an adaptive unsharp masking module operatively coupled to the content adaptive level generation module, the adaptive unsharp masking module configured for applying an adaptive unsharp mask to the luminance pixels to generate improved luminance pixels;
h. a UV adjustment module operatively coupled to the adaptive unsharp masking module, the UV adjustment module configured for adjusting the U and V pixel value using the level to generate improved chrominance pixels; and
i. a YUV mix module operatively coupled to the UV adjustment module, the YUV mix module configured for combining the improved luminance pixels and the improved chrominance pixels and outputting an enhanced image.

26. The system of claim 25 wherein the minimum/maximum luminance extraction module is further configured for adjusting the maximum intensity value and the minimum value intensity value according to a first threshold and a second threshold.

27. The system of claim 25 wherein estimating airtight and calculating the content dependent parameter occur at the same time.

28. The system of claim 25 wherein the parameter depends on a pixel location and overall intensity distribution of the image.

29. The system of claim 25 wherein the content dependent parameter extraction module is further configured for:
 a. detecting a skyline point in each pixel column;
 b. calculating an offset for each pixel column; and
 c. calculating the parameter using a height of the skyline point and the offset.

30. The system of claim 25 wherein each luminance pixel is adjusted based on the additive airlight, the maximum luminance intensity value, the minimum luminance intensity value and the content dependent parameter.

31. The system of claim 25 wherein the content adaptive level generation module is further configured for:
 a. checking the chrominance pixel intensity;
 b. continuing to adjustment level generation, if the intensity is greater than a threshold including:
  i. calculating an initial adjustment level;
  ii. calculating an adaptive threshold; and
  iii. determining a final adjustment level; and
 c. not adjusting the level if the intensity is not greater than the threshold.

32. The system of claim 25 wherein combining occurs after all of the pixels are processed.

33. The system of claim 25 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

34. A device comprising:
a. a memory for storing an application, the application configured for:
 i. calculating a maximum luminance intensity value and a minimum luminance intensity value among pixels in an image;
 ii. estimating airlight with the obtained maximum intensity value;
 iii. calculating a content dependent parameter for each pixel in the image;
 iv. calculating an additive airlight with the maximum luminance intensity value, the minimum luminance intensity value and the content dependent parameter;
 v. adjusting each luminance pixel;
 vi. applying an adaptive unsharp masking to the luminance pixels to generate improved luminance pixels;
 vii. generating a content adaptive adjustment level for each U and V pixel;
 viii. adjusting each U and V pixel value using the level to generate improved chrominance pixels;
 ix. combining the improved luminance pixels with the improved chrominance pixels; and
 x. outputting an enhanced image; and
b. a processing component coupled to the memory, the processing component configured for processing the application.

35. The device of claim 34 wherein the application is further configured for adjusting the maximum intensity value and the minimum value intensity value according to a first threshold and a second threshold.

36. The device of claim 34 wherein estimating airlight and calculating the content dependent parameter occur at the same time.

37. The device of claim 34 wherein the parameter depends on a pixel location and overall intensity distribution of the image.

38. The device of claim 34 wherein calculating the parameter further comprises:
 a. detecting a skyline point in each pixel column;
 b. calculating an offset for each pixel column; and
 c. calculating the parameter using a height of the skyline point and the offset.

39. The device of claim 34 wherein each luminance pixel is adjusted based on the additive airlight, the maximum luminance intensity value, the minimum luminance intensity value and the content dependent parameter.

40. The device of claim 34 wherein generating the content adaptive adjustment level further comprises:
 a. checking the chrominance pixel intensity;
 b. continuing to adjustment level generation, if the intensity is greater than a threshold including:
  i. calculating an initial adjustment level;
  ii. calculating an adaptive threshold; and
  iii. determining a final adjustment level; and
 c. not adjusting the level if the intensity is not greater than the threshold.

41. The device of claim 34 wherein combining occurs after all of the pixels are processed.

42. The device of claim 34 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

43. A camera comprising:
  a. a lens;
  b. a sensor configured for acquiring an input image through the lens;
  c. a memory for storing an application, the application configured for:
    i. calculating a maximum luminance intensity value and a minimum luminance intensity value among pixels in the image;
    ii. estimating airlight with the obtained maximum intensity value;
    iii. calculating a content dependent parameter for each pixel in the image;
    iv. calculating an additive airlight with the maximum luminance intensity value, the minimum luminance intensity value and the content dependent parameter;
    v. adjusting each luminance pixel;
    vi. applying an adaptive unsharp masking to the luminance pixels to generate improved luminance pixels;
    vii. generating a content adaptive adjustment level for each U and V pixel;
    viii. adjusting each U and V pixel value using the level to generate improved chrominance pixels;
    ix. combining the improved luminance pixels with the improved chrominance pixels; and
    x. outputting an enhanced image; and
  d. a processing component coupled to the memory, the processing component configured for processing the application.

* * * * *